(12) United States Patent
Loeffelmann et al.

(10) Patent No.: US 11,808,305 B2
(45) Date of Patent: Nov. 7, 2023

(54) SHIFTING GROUP, AND DRIVE TRAIN WITH A SHIFTING GROUP OF THIS TYPE

(71) Applicant: Schaeffler Technologies AG & Co. KG, Herzogenaurach (DE)

(72) Inventors: Jochen Loeffelmann, Eggolsheim (DE); Simon Leubner, Nuremberg (DE); Waldemar Neugebauer, Emskirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 131 days.

(21) Appl. No.: 17/606,100

(22) PCT Filed: Apr. 2, 2020

(86) PCT No.: PCT/DE2020/100273
§ 371 (c)(1),
(2) Date: Oct. 25, 2021

(87) PCT Pub. No.: WO2020/216406
PCT Pub. Date: Oct. 29, 2020

(65) Prior Publication Data
US 2022/0196080 A1   Jun. 23, 2022

(30) Foreign Application Priority Data
Apr. 23, 2019   (DE) .......................... 102019110478.5

(51) Int. Cl.
*F16D 11/10*   (2006.01)
*F16D 27/108*   (2006.01)
*F16D 23/12*   (2006.01)
*F16D 11/14*   (2006.01)
*F16D 23/02*   (2006.01)
(Continued)

(52) U.S. Cl.
CPC .............. *F16D 11/10* (2013.01); *F16D 11/14* (2013.01); *F16D 23/12* (2013.01); *F16D 27/108* (2013.01);
(Continued)

(58) Field of Classification Search
CPC .... F16D 2011/006; F16D 11/10; F16D 11/14; F16D 23/02; F16D 23/12;
(Continued)

(56) References Cited

U.S. PATENT DOCUMENTS 4,238,012 A   12/1980   Ohhazama et al.
7,942,252 B2   5/2011   Schnitzer
(Continued)

FOREIGN PATENT DOCUMENTS

CN   2934772 Y   8/2007
CN   201810697 U   4/2011
(Continued)

*Primary Examiner* — Richard M Lorence
(74) *Attorney, Agent, or Firm* — Volpe Koenig

(57) ABSTRACT

A shifting group for a drive train of a motor vehicle for coupling and decoupling a drive shaft of a drive train as required, with an actuator for actuating a blocking element, a selector rod and a selector fork which is connected to the selector rod. The first drive shaft and the second drive shaft are arranged coaxially with respect to one another, the blocking element blocks an axial displacement of the selector rod in a first switching position and enables said axial displacement in a second switching position, the selector fork engages into a groove of one of the drive shafts, an actuation of the shifting group brings about an axial displacement of a drive shaft, and a clutch between the first drive shaft and the second drive shaft is opened or closed by way of the axial displacement of the selector fork.

20 Claims, 3 Drawing Sheets

(51) Int. Cl.
*F16D 11/00* (2006.01)
*F16D 23/14* (2006.01)

(52) U.S. Cl.
CPC ........ *F16D 23/02* (2013.01); *F16D 2011/006* (2013.01); *F16D 2023/141* (2013.01)

(58) Field of Classification Search
CPC ......... F16D 2023/123; F16D 2023/141; F16D 27/108; F16H 63/34; F16H 63/38
See application file for complete search history.

(56) References Cited

U.S. PATENT DOCUMENTS

| | | |
|---|---|---|
| 2004/0254704 A1 | 12/2004 | Terada |
| 2010/0239439 A1 | 9/2010 | Zwiep et al. |
| 2013/0017919 A1* | 1/2013 | Klemm ............... F16H 63/3023 475/296 |
| 2013/0199885 A1* | 8/2013 | Quehenberger ........ F16D 27/10 192/85.01 |

FOREIGN PATENT DOCUMENTS

| | | |
|---|---|---|
| CN | 201944249 U | 8/2011 |
| DE | 102005027299 A1 | 11/2006 |
| DE | 102014217066 | 3/2015 |
| EP | 2478241 A1 | 7/2012 |
| EP | 2546086 | 1/2013 |
| JP | 2004345584 A | 12/2004 |
| WO | 2011034489 | 3/2011 |
| WO | 2011098595 | 8/2011 |

* cited by examiner

SHIFTING GROUP, AND DRIVE TRAIN WITH A SHIFTING GROUP OF THIS TYPE

CROSS-REFERENCE TO RELATED APPLICATIONS

This application is the U.S. National Phase of PCT Appln. No. PCT/DE2020/100273, filed Apr. 2, 2020, which claims priority from German Patent Application No. 10 2019 110 478.5, filed Apr. 23, 2019, the entire disclosures of which are incorporated by reference herein.

TECHNICAL FIELD

The disclosure relates to a shifting group for coupling and decoupling a shaft to a drive train of a motor vehicle and a drive train with such a shifting group.

BACKGROUND

In motor vehicles with switchable all-wheel drive, so-called "disconnect systems" for decoupling parts of the drive train are known. In the context of the increasing electrification of motor vehicles, hybrid drives are known in which the primary drive is provided by an internal combustion engine or a first electric motor which drives the wheels on a main drive axle of the motor vehicle. It is also known to drive the wheels of a second axle by means of a further electric motor, which can be coupled to the drive train by means of a switchable axle drive. Hybrid vehicles are known from the prior art that have an electric drive motor and an internal combustion engine, which are operatively connected in a common drive train. Hybrid vehicles are known in which the electric motor can be switched on in order to increase the drive torque at low speeds of the internal combustion engine. In particular, such hybrid drives can be used to represent a switchable all-wheel drive for a motor vehicle, wherein the internal combustion engine and the electric motor act on different drive axles. Furthermore, the electric motor can be switched on for the purpose of recuperation in order to recover energy when braking. Hybrid drive concepts with different drive machines allow a variable drive concept, which can be easily adapted to the respective operating state by switching the various motors on and off as required. It may be necessary to separate one or more drive motors from the drive train of the motor vehicle if necessary in order to minimize losses in the drive train and/or to avoid damage to the drive motors due to operation outside the permissible operating range, in particular outside the permissible maximum speed.

Alternatively, such a shifting group can also be used to separate the transmission from the drive train in a motor vehicle with hybrid drive in an operating state in which the drive is exclusively provided by the electric motor, in order to reduce the power loss and to minimize the transmission noise.

From DE 10 2014 217 066 A1, a clutch for a switchable all-wheel drive is known, in which two coaxial drive shafts are connected to one another by a clutch part that enables a positive connection between the two drive shafts. The clutch has a shifting element with which a clutch part that is displaceable in the axial direction is displaced in such a way that the positive connection between the two drive shafts is established.

A coupling assembly for a drive train of a motor vehicle is known from WO 2011/098 595 A1, which comprises at least one clutch that is arranged on a rotating shaft in order to selectively couple the rotating shaft to a drive element of the drive train. The coupling assembly further comprises at least one actuating device for actuating the clutch. The actuating device is designed to selectively bring an engagement section into engagement with a threaded section rotating with the shaft in order to bring about a relative movement of the engagement section and the threaded section along the axis of the rotating shaft and thereby to actuate the clutch in the axial direction.

SUMMARY

The object of the disclosure is to propose a particularly simple, light and inexpensive shifting group that enables a drive train to be coupled and decoupled as required.

The design and arrangement of the mechanics described herein makes it possible in particular to design the drive train and/or the shifting group as separate assemblies, which can be integrated into existing drive axles due to their modular structure.

According to the disclosure, this object is achieved by a shifting group for a drive train of a motor vehicle for the coupling and decoupling of a drive shaft of a drive train as required, which comprises an actuator for actuating a blocking element, a selector rod and a selector fork connected to the selector rod, wherein the first drive shaft and the second drive shaft are arranged coaxially with respect to one another. The blocking element blocks an axial displacement of the selector rod in a first shifting position and releases an axial displacement in a second shifting position. It is provided that the selector fork engages into a groove in one of the drive shafts, wherein an actuation of the shifting group causes an axial displacement of a drive shaft. By axially displacing the selector fork, a clutch between the first drive shaft and the second drive shaft is opened or closed in such a way that a drive torque is transmitted from the first drive shaft in a first operating state to the second drive shaft, and in a second operating state a connection between the first drive shaft and the second drive shaft is interrupted. The actuator, which preferably has a linearly displaceable actuator pin, which comes into operative connection with the blocking element when the actuator pin is extended, enables particularly simple actuation of the shifting group. The shifting mechanism can be unblocked in a simple manner and displaced in the axial direction in order to close the connection between the first drive shaft and the second drive shaft, via which a torque can be transmitted. In this way, a drive motor, in particular an electric drive motor, can be switched on in order to increase the drive torque and improve the efficiency of the motor vehicle, in particular when starting and accelerating. The actuator can be designed as an electrically or hydraulically operated actuator, wherein an activation of the actuator, in particular the application of an electrical voltage to the actuator, leads to activation of the actuator. This ensures that the switchable drive motor is decoupled if the actuator fails. Alternatively, a side shaft of a drive train can be decoupled by the actuator in order to minimize the friction losses. It is provided in particular that a second drive motor and/or a transmission are decoupled from the drive train by the actuator in order to decouple the transmission from the drive train and thus minimize the power loss when the load requirements are low.

In a preferred embodiment of the disclosure it is provided that the actuator comprises a lifting magnet. A lifting magnet enables particularly simple actuation of the actuator pin. As a result, the blocking element can be actuated in a particularly simple manner, as a result of which the coupling or decoupling of the drive shafts is facilitated.

In a preferred embodiment of the disclosure it is provided that the blocking element has a blocking pawl which in the first shifting position rests in a groove of the selector rod and thus blocks an axial displacement of the selector rod and the blocking pawl is unscrewed from the groove in a second shifting position and thus enables the selector rod to be displaced axially. An axial displacement of the selector shaft can be blocked in a simple manner by means of a blocking pawl. The blocking pawl can release or lock the axial displacement of the selector rod by rotating the blocking element. Alternatively, the blocking pawl can also engage in a recess in the selector rod in order to block the axial displacement.

In an advantageous embodiment of the shifting group it is provided that the selector rod is pretensioned in the axial direction by means of a compression spring. A compression spring allows the selector rod and the selector fork connected to it to be shifted in a simple and inexpensive manner in order to enable the drive shafts to be coupled or decoupled. The compression spring pushes the switching mechanism in the direction of the drive shaft clutch in order to establish a positive and/or non-positive connection between the first drive shaft and the second drive shaft, so that a torque can be transmitted via this drive shaft clutch.

In a preferred embodiment of the disclosure it is provided that a control pin is received in the selector rod, which protrudes in the radial direction over the selector rod. The control pin can be used to easily push the switch rod back into the starting position. This can be done by means of a correspondingly designed mechanism or an additional actuator. An embodiment is preferred which implements the pushing back of the selector rod for decoupling the second drive shaft by means of a suitable mechanism, so that the shifting group manages with only one actuator.

It is particularly preferred if a control contour is formed on one of the drive shafts which can come into operative connection with the control pin and thereby displaces the selector rod in the axial direction. The control contour is designed in particular as a cam or as an inclined contour. The control pin is actuated via the control contour in such a way that the selector rod is pushed back into its starting position against the force of the compression spring. The connection between the first drive shaft and the second drive shaft is thus released. If the selector rod is displaced sufficiently far in the axial direction against the spring force of the compression spring, the blocking pawl can be reset by rotating the blocking element. As a result, the blocking element blocks an axial movement of the displacement unit through the blocking pawl. Once the selector rod has displaced axially, there is no longer any transverse load acting on the control pin and the pin spring returns it to its original position. The selector rod is pretensioned by the compression spring and presses against the blocking pawl.

In an advantageous improvement of the disclosure it is provided that the shifting group has a torsion spring which is in operative connection with the blocking element in such a way that the torsion spring rotates the blocking element back into its initial position when the actuator is not actuated. By means of a torsion spring, a restoring force can be generated in a simple and inexpensive manner, which restores the blocking element back to its starting position against the rotation by the actuator. This ensures that the pawl engages in a reliable manner, so that axial displacement of the selector rod is avoided in the event of failure of the actuator.

In a preferred embodiment of the shifting group it is provided that the first drive shaft and the second drive shaft are connectable to one another by means of a dog clutch. By means of a dog clutch, a torque can be transmitted between the two coaxial drive shafts in a simple and reliable manner. This enables a second drive axle to be connected to the drive train in a simple manner.

Alternatively, it is advantageously provided that a synchronization mechanism is arranged between the first drive shaft and the second drive shaft in order to equalize the speeds of the drive shafts. A synchronization mechanism enables the second drive shaft to be coupled to the first drive shaft in a particularly convenient manner. In addition, shift shocks can be avoided or reduced, which could reduce the durability of the clutch.

In an advantageous embodiment of the disclosure it is provided that the stops for the selector rod are dampened with plastic disks in order to optimize the acoustics of the drive train. Acoustic damping can be implemented by means of appropriate plastic disks, with the selector rod being able to be decoupled from a housing or a carrier in which the selector rod is mounted. This minimizes the transmission of structure-borne noise, which reduces the development of noise.

In an advantageous embodiment of the shift mechanism it is provided that the selector fork and the actuator are arranged in a common housing. A common housing enables acoustic encapsulation, which can reduce noise. Furthermore, the risk of a malfunction due to dirt or dust entering the shifting group can be minimized by means of such a housing.

In a further improvement of the switching mechanism, it is provided that the shifting group comprises electronics, in particular a sensor, with which the coupling state of the drive train can be determined. The electronics can in particular have a position sensor for detecting the position of the selector rod. This makes it possible to check whether the clutch is open or closed. Furthermore, a shifting command can be prevented from being forwarded to the actuator when the sensor detects that the drive train is in an operating state in which coupling or decoupling for component protection should not be carried out.

According to the disclosure, a drive train with a first drive shaft and a second drive shaft is proposed. The drive shafts of the drive train are connectable to one another by means of a shifting group according to the invention via a switchable clutch. With such a drive train, an additional drive motor can be switched on or off in a simple manner. The speed between the two drive shafts of the drive train can be adjusted by a synchronization mechanism in order to ensure a comfortable connection of the switchable drive motor and to avoid shift shocks, which reduce the service life of the drive motor and/or the motor vehicle transmission and from the passengers of a motor vehicle with such motor vehicle transmissions are otherwise perceived as disturbances in comfort.

The various embodiments of the invention cited in this application may be advantageously combined, unless otherwise indicated in the individual case.

BRIEF DESCRIPTION OF THE DRAWINGS

In the following, the disclosure is explained by means of preferred embodiments with reference to the attached figures. Identical components or components with the same function are marked with the same reference symbols. In the figures.

DETAILED DESCRIPTION

Figure 1:
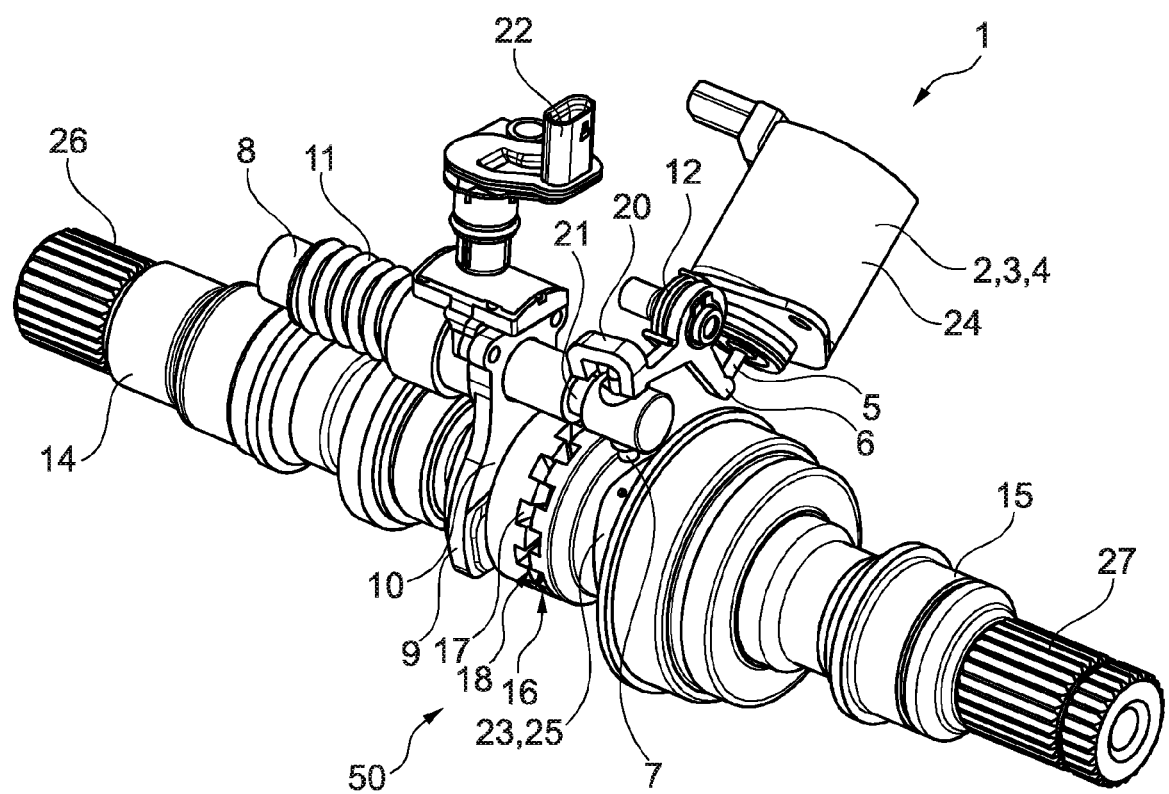
FIG. 1 shows an exemplary embodiment of a drive train with a shifting group according to the disclosure in a three-dimensional representation.

In FIG. 1, an exemplary embodiment of a drive train of a motor vehicle is shown with a switchable side train. Such a drive train can be used in particular in a motor vehicle with switchable all-wheel drive or with a plurality of drive motors which drive different drive axles of the motor vehicle. The drive train comprises a first drive shaft 14 and a second drive shaft 15, which are connectable to one another in a rotationally fixed manner by means of a switchable drive shaft clutch 50, in particular by means of a switchable dog clutch 16. The two drive shafts 14, 15 have a contour, in particular a toothing, on their mutually facing end faces 17, 18, via which a form fit between the first drive shaft 14 and the second drive shaft 15 can be established. At its end facing away from the drive shaft clutch 50, the first drive shaft 14 has a toothing 26 on which the first drive shaft 26 is connectable non-rotatably to a drive unit, in particular an electric drive motor or a gearbox, in order to transmit a torque. The second drive shaft 15 has a toothing 27 at its end facing the drive shaft clutch 50, with which the second drive shaft 15 is connectable non-rotatably to a second drive motor or a gear, in particular an axle drive or a differential.

The drive shaft clutch 50 can be opened and closed by means of a shifting group 1. The shifting group 1 comprises an actuator 2, which is preferably designed as an electrical actuator 4, in particular as a lifting magnet 24. Alternatively, the actuator 2 can also be designed as a hydraulic actuator 3. The actuator 2 has an actuator pin 5 which is linearly displaceable when the actuator 2 is activated and acts on a blocking element 6 which is rotated when the actuator 2 is activated. The shifting group 1 further comprises a shift mechanism 8, 9 with a selector rod 8 and a selector fork 9 firmly connected to the selector rod 8. The selector fork 9 is connected to the selector rod 8 by means of a connecting element 10. The selector fork 9 engages into a groove 19 or a shoulder in the first drive shaft 14, as a result of which there is a positive connection between the selector fork 9 and the first drive shaft 14. The selector rod 8 is pretensioned by means of a compression spring 11 and is fixed in its starting position by a blocking pawl 20, wherein the blocking pawl 20 engages into a groove 21 or a shoulder of the selector rod 8 and thus fixes the selector rod 8 in its position. The blocking pawl 20 can be opened by means of the blocking element 6. For this purpose, the blocking element 6 is rotated against the force of a torsion spring 12 by the actuator pin 5 and thus lifts the blocking pawl 20 out of the groove 21 or the shoulder of the selector rod 8.

A control pin 7 is received in the selector rod 8 and protrudes in the radial direction over the selector rod 8. The control pin 7 is pretensioned by a pin spring 13. A control contour, in particular an inclined contour 23 or a cam 25, which can come into operative connection with the control pin 7, is formed on the second drive shaft 15. If the activation of the actuator 2 is ended and the actuator pin 5 is retracted again, the torsion spring 12 returns the blocking element 6 to its starting position. The control pin 7 pushes the selector rod 8 against the spring force of the compression spring 11 back into its initial position until the blocking pawl 20 engages into the groove 21 or the shoulder of the selector rod 8 again and blocks it in the axial direction. The shifting group 1 further comprises a sensor 22, in particular a position sensor, in order to monitor the shifting position and to determine whether the two drive shafts 14, 15 are in a coupled or decoupled operating state. The shifting group 1 can furthermore comprise further electrical components and/or sensors in order to facilitate the actuation and/or to check the function.

Figure 2:
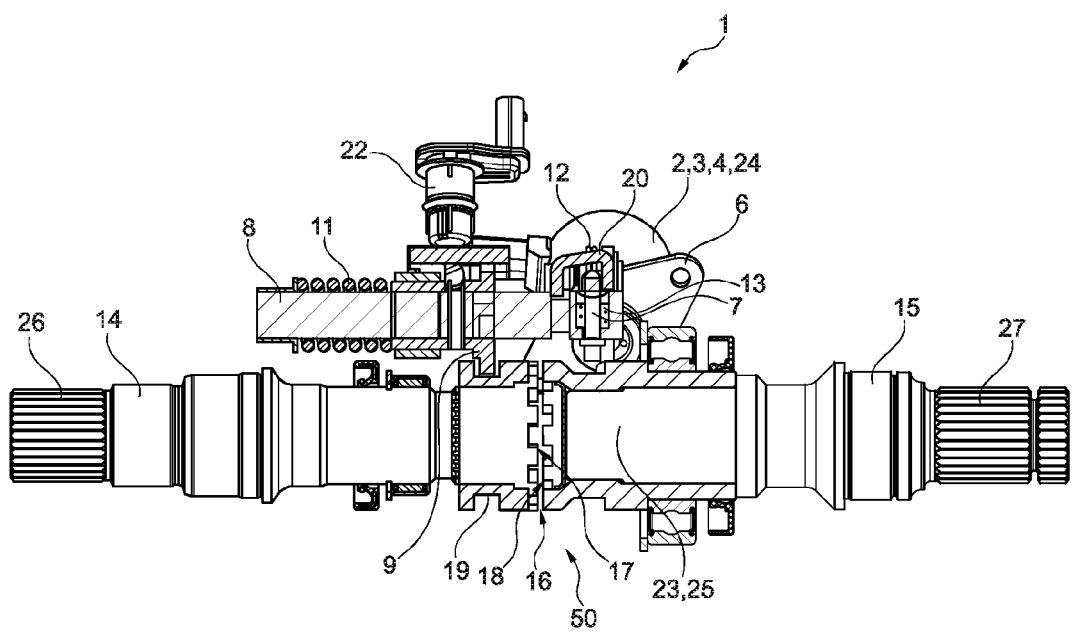
FIG. 2 shows a side view of a drive train with a shifting group according to the disclosure.

In FIG. 2, an embodiment of a shifting group 1 according to the disclosure for the needs-based switching on and off of a drive motor in the drive train of a motor vehicle is shown. The shifting group 1 comprises an actuator 2, in particular an electrically activatable actuator 4, which causes a linear displacement of an actuator pin 5 when the actuator 2 is activated. When the actuator 2 is activated, the actuator pin 5 is in operative connection with a blocking element 6, which is rotated during a linear displacement of the actuator pin 5 such that an axial displacement of a switching mechanism 8, 9 of the shifting group 1 is released. The shift mechanism 8, 9 comprises a selector rod 8 and a selector fork 9, which is connected to the selector rod 8 by means of a connecting element 10. The selector rod 8 is pretensioned by a compression spring 11 in such a way that the release of a blocking pawl 20 causes an axial displacement of the selector rod 8 and thus the selector fork 9 when the shift mechanism 8, 9 is released by rotating the blocking element 6. For this purpose, the selector fork 9 engages in a groove 19 in the first drive shaft 14, as a result of which there is a positive connection between the selector fork 9 and the first drive shaft 14.

The selector rod 8 carries a control pin 7, which protrudes over the selector rod 8 in the radial direction. The control pin 7 can be brought into operative connection with a control contour 23, in particular an inclined contour or a cam 25 on the second drive shaft 15, wherein the control pin 7 is preferably positively received in the control contour 24 and latches into it. The shifting group 1 further comprises a torsion spring 12 which turns the blocking element 6 back into its starting position against the movement of the actuator 2 when an activation, in particular an energization of the actuator 2, is ended.

Figure 3:
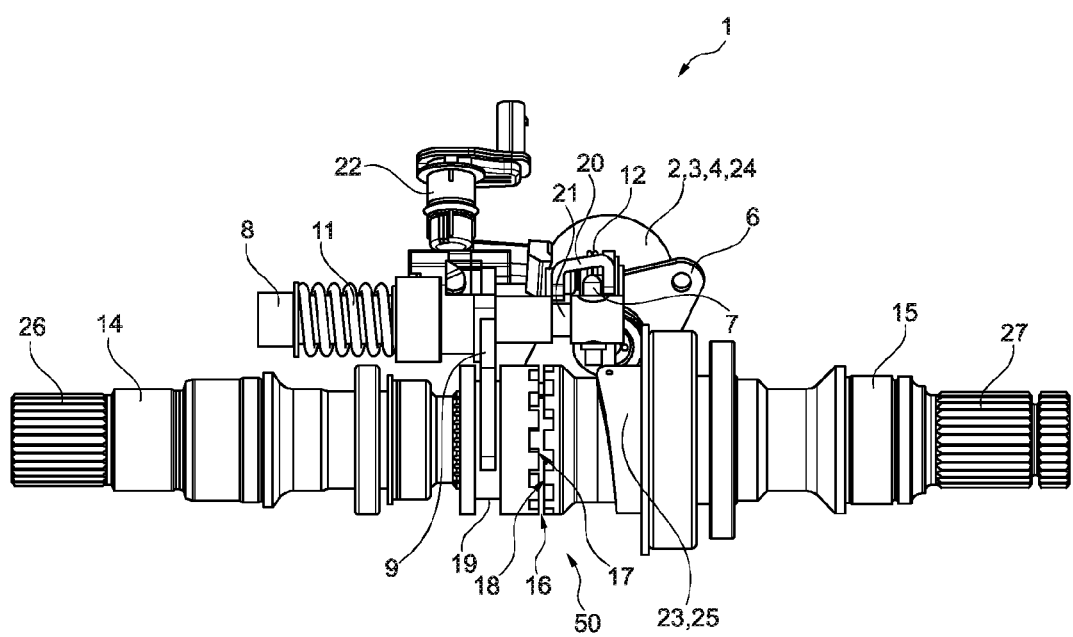
FIG. 3 shows a further representation of a drive train with a shifting group according to the disclosure.

In FIG. 3, the drive train is shown in a further development. The shifting group 1 is provided in particular to separate a drive motor and/or a transmission from the drive train in a motor vehicle with two drive motors and thus to minimize the friction and power loss when there is only a low power requirement for the motor vehicle, which can be met by one of the drive motors. In FIGS. 1 to 3, the drive shaft clutch 50 is shown in an open operating state in which the actuator 2 is not activated and thus the two drive shafts 14, 15 are separated from one another in such a way that no drive torque is transmitted between the first drive shaft 14 and the second drive shaft 15. By activating the actuator 2, the blocking element 6 is rotated, as a result of which the blocking pawl 20 lifts out of the groove 21 of the selector rod 8. As a result, the selector rod 8 pretensioned by the spring force of the compression spring 11 is displaced in the axial direction in such a way that the two mutually facing end faces 17, 18 of the drive shafts 14, 15 are pressed against each other and the drive shaft clutch 50 closes. As a result, the second drive shaft 15 is coupled to the first drive shaft 14.

LIST OF REFERENCE SYMBOLS

1 Shifting group
2 Actuator

3 Hydraulic actuator
4 Electric actuator
5 Actuator pin
6 Blocking element
7 Control pin
8 Selector rod
9 Selector fork
10 Connecting element
11 Compression spring
12 Torsion spring
13 Pin spring
14 First drive shaft
15 Second drive shaft
16 Dog clutch
17 First face
18 Second face
19 Groove
20 Blocking pawl
21 Groove
22 Sensor
23 Inclined contour
24 Lifting magnet
25 Cam
26 Toothing
27 Toothing
50 Drive shaft clutch

The invention claimed is:

1. A shifting group for a drive train of a motor vehicle for coupling and decoupling a drive shaft of the drive train, the shifting group comprising:
an actuator for actuating a blocking element;
a selector rod and a selector fork which is connected to the selector rod, and a control pin received in the selector rod which protrudes in a radial direction over the selector rod;
the drive shaft including a first drive shaft and a second drive shaft arranged coaxially with respect to one another;
the blocking element being configured for blocking an axial displacement of the selector rod in a first shifting position and releasing the selector rod for axial displacement in a second shifting position;
the selector fork engages into a groove of one of the first or second drive shafts, and an actuation of the shifting group brings about an axial displacement of the one of the first or second drive shafts; and
a clutch between the first drive shaft and the second drive shaft is adapted to be opened or closed by the axial displacement of the selector fork such that a drive torque is transmitted from the first drive shaft to the second drive shaft in a first operating state, and in a second operating state a connection between the first drive shaft and the second drive shaft is interrupted.

2. The shifting group according to claim 1, wherein the actuator comprises a lifting magnet.

3. The shifting group according to claim 1, wherein the blocking element has a blocking pawl which in the first shifting position rests in a groove of the selector rod and blocks an axial displacement of the selector rod and the blocking pawl is disengaged from the groove in a second shifting position and enables the selector rod to be displaced axially.

4. The shifting group according to claim 1, wherein the selector rod is pretensioned in an axial direction by a compression spring.

5. The shifting group according to claim 1, further comprising a control contour formed on one of the first or second drive shafts, the control contour being movable into operative connection with the control pin to displace the selector rod in an axial direction.

6. The shifting group according to claim 1, further comprising a torsion spring in operative connection with the blocking element such that the torsion spring is configured to rotate the blocking element back to an initial position when the actuator is not actuated.

7. The shifting group according to claim 1, wherein the first drive shaft and the second drive shaft are connectable to one another by the clutch which comprises a dog clutch.

8. The shifting group according to claim 1, further comprising a synchronization mechanism arranged between the first drive shaft and the second drive shaft configured to equalize speeds of the drive shafts.

9. A drive train, comprising the shifting group according to claim 1, wherein the first drive shaft is connectable to a first drive motor or a transmission, and the second drive shaft is connectable to a second drive motor, and the first drive shaft and the second drive shaft being connectable to one another via the clutch.

10. A shifting group for a drive train of a motor vehicle, the shifting group comprising:
an actuator for actuating a blocking element;
a selector rod and a selector fork connected to the selector rod;
the blocking element having a pawl that blocks an axial displacement of the selector rod in a first shifting position and releases the selector rod for axial displacement in a second shifting position;
a first drive shaft and a second drive shaft arranged coaxially aligned with respect to one another;
the selector fork engages into a groove of the first drive shaft and actuation of the shifting group brings about an axial displacement of the first drive shaft toward the second drive shaft; and
a clutch between the first drive shaft and the second drive shaft is adapted to be opened or closed by the axial displacement of the selector fork such that a drive torque is transmitted from the first drive shaft to the second drive shaft in a first operating state, and a connection between the first drive shaft and the second drive shaft is interrupted in a second operating state.

11. The shifting group according to claim 10, wherein the actuator comprises a lifting magnet.

12. The shifting group according to claim 10, wherein the pawl rests in a groove of the selector rod in the first shifting position and blocks an axial displacement of the selector rod and the pawl is disengaged from the groove in a second shifting position and enables the selector rod to be displaced axially.

13. The shifting group according to claim 10, further comprising a compression spring that pretensions the selector rod in an axial direction to shift the first drive shaft in the axial direction upon activation of the actuator.

14. The shifting group according to claim 10, further comprising a control pin received in the selector rod which protrudes in a radial direction beyond the selector rod.

15. The shifting group according to claim 14, further comprising a control contour formed on the second drive shaft, the control contour being movable into operative connection with the control pin to displace the selector rod in an axial direction to the position in which the connection between the first drive shaft and the second drive shaft is interrupted.

16. The shifting group according to claim 10, further comprising a spring that biases the blocking element to the first shifting position when the actuator is not actuated.

17. The shifting group according to claim 10, wherein the clutch which comprises a dog clutch.

18. The shifting group according to claim 10, further comprising a synchronizer arranged between the first drive shaft and the second drive shaft.

19. A shifting group for a drive train of a motor vehicle for coupling and decoupling a drive shaft of the drive train, the shifting group comprising:
- an actuator for actuating a blocking element;
- a selector rod and a selector fork which is connected to the selector rod;
- the drive shaft including a first drive shaft and a second drive shaft arranged coaxially with respect to one another;
- the blocking element being configured for blocking an axial displacement of the selector rod in a first shifting position and releasing the selector rod for axial displacement in a second shifting position;
- a torsion spring in operative connection with the blocking element such that the torsion spring is configured to rotate the blocking element back to an initial position when the actuator is not actuated;
- the selector fork engages into a groove of one of the first or second drive shafts, and an actuation of the shifting group brings about an axial displacement of the one of the first or second drive shafts; and
- a clutch between the first drive shaft and the second drive shaft is adapted to be opened or closed by the axial displacement of the selector fork such that a drive torque is transmitted from the first drive shaft to the second drive shaft in a first operating state, and in a second operating state a connection between the first drive shaft and the second drive shaft is interrupted.

20. A drive train, comprising the shifting group according to claim 19, wherein the first drive shaft is connectable to a first drive motor or a transmission, and the second drive shaft is connectable to a second drive motor, and the first drive shaft and the second drive shaft being connectable to one another via the clutch.

* * * * *